US005718199A

United States Patent [19]

Hu et al.

[11] Patent Number: 5,718,199

[45] Date of Patent: Feb. 17, 1998

[54] ELECTRONIC CONTROLS FOR COMPRESSION RELEASE ENGINE BRAKES

[75] Inventors: Haoran Hu, Farmington, Conn.; John A. Konopka, Feeding Hills, Mass.

[73] Assignee: Diesel Engine Retarders, Inc., Wilmington, Del.

[21] Appl. No.: 320,049

[22] Filed: Oct. 7, 1994

[51] Int. Cl.$^6$ .......................... F02D 13/04; B60K 31/00

[52] U.S. Cl. .......................... 123/322; 123/352; 180/179

[58] Field of Search .......................... 123/321, 322, 123/323, 320, 90.11, 352; 180/170, 178, 179

[56] References Cited

U.S. PATENT DOCUMENTS

| | | | |
|---|---|---|---|
| 4,009,695 | 3/1977 | Ule | 123/90.13 |
| 4,355,605 | 10/1982 | Robinson et al. | 123/320 |
| 4,398,510 | 8/1983 | Custer | 123/90.16 |
| 4,572,114 | 2/1986 | Sickler | 123/21 |
| 4,592,319 | 6/1986 | Meistrick | 123/321 |
| 4,664,070 | 5/1987 | Meistrick et al. | 123/21 |
| 4,787,044 | 11/1988 | Nagata et al. | 123/323 X |
| 5,012,778 | 5/1991 | Pitzi | 123/321 |
| 5,117,790 | 6/1992 | Clarke et al. | 123/90.11 X |
| 5,121,723 | 6/1992 | Stepper et al. | 123/322 |
| 5,146,890 | 9/1992 | Gobert et al. | 123/321 |
| 5,168,855 | 12/1992 | Stone | 123/446 |
| 5,191,867 | 3/1993 | Glassey | 123/446 |
| 5,255,650 | 10/1993 | Faletti et al. | 123/90.11 X |
| 5,483,927 | 1/1996 | Letang et al. | 123/322 X |
| 5,540,201 | 7/1996 | Feucht et al. | 123/322 |

FOREIGN PATENT DOCUMENTS

| | | |
|---|---|---|
| 2616481 | 12/1988 | France . |
| 4236009 | 4/1994 | Germany . |
| 1395027 | 5/1975 | United Kingdom . |

*Primary Examiner*—Tony M. Argenbright

*Attorney, Agent, or Firm*—Collier, Shannon, Rill & Scott

[57] ABSTRACT

Electronic controls for compression release engine brakes of the type having electrically controlled valves for selectively applying high pressure hydraulic fluid to hydraulic actuators which open exhaust valves in the associated internal combustion engine to produce compression release events in the engine. The electronic controls may produce signals for both opening and closing the electrically controlled valves. The electronic controls may monitor various operating conditions of the engine and the vehicle powered by the engine and may automatically modify the timing of the compression release events in accordance with those conditions.

26 Claims, 6 Drawing Sheets

ELECTRONIC CONTROLS FOR COMPRESSION RELEASE ENGINE BRAKES

BACKGROUND OF THE INVENTION

This invention relates to compression release engine brakes, and more particularly to electronic controls for such engine brakes.

As is well known to those skilled in the art, compression release engine brakes operate to temporarily convert an associated internal combustion engine from a power source to a power-absorbing gas compressor when the engine brake is turned on and the fuel supply to the engine is cut off. In general, such engine brakes operate in this way by opening the exhaust valves in the engine cylinders when the engine cylinders contain air they have compressed. For example, the engine brake may open an exhaust valve in the engine near top dead center of each compression stroke of the engine cylinder served by that exhaust valve. This allows compressed air to escape from the engine, thereby preventing the engine from recovering the work of compressing that air. (As an alternative to using a conventional exhaust valve for this purpose, the same result may be achieved by having the engine brake open a special-purpose valve that has been added to each engine cylinder. (See, for example, Gobert et al. U.S. Pat. No. 5,146,890.) Because such special-purpose valves are so much like conventional exhaust valves in this connection, it will be understood that, as used herein, terms like "exhaust valves" include both conventional exhaust valves and special-purpose valves added for use in producing compression release events. By preventing the engine from recovering the work of compressing air the engine has compressed, the engine brake enables the engine to absorb much more kinetic energy from the vehicle powered by the engine. The engine therefore becomes much more effective in slowing down or holding back the vehicle, thereby prolonging the life of the vehicle's wheel brakes and increasing the safety of operation of the vehicle.

Most known compression release engine brakes produce the above-described exhaust valve openings by hydraulically transferring an appropriately timed motion from another part of the engine to the exhaust valve to be opened to produce a compression release event. For example, a master piston in a hydraulic circuit in the engine brake may be operated by an intake or exhaust valve opening mechanism of another engine cylinder or by the fuel injector mechanism of the same engine cylinder in which the compression release event is to be produced. A slave piston in that hydraulic circuit responds to operation of the master piston by opening an associated exhaust valve to produce the compression release event.

It can be difficult or even impossible to produce optimally timed exhaust valve openings using the conventional approach described above. Many complex mechanical, hydraulic, etc., refinements have been devised to improve the compression release event timing options available to the engine brake designer. Some of these refinements work extremely well, but they have a tendency to increase the cost of the engine brake.

Recently, engine brakes have been developed which use electronically controlled valves to apply high pressure hydraulic fluid to hydraulic actuators which open associated engine exhaust valves to produce compression release events. Such engine brakes are shown in Pitzi U.S. Pat. No. 5,012,778. More sophisticated electronic controls are needed for such brakes.

In view of the foregoing, it is an object of this invention to provide improved electronic controls for compression release engine brakes.

It is a more particular object of this invention to provide improved electronic controls for compression release engine brakes of the type which employ electronically controlled valves for applying high pressure hydraulic fluid to hydraulic actuators when compression release events are desired.

SUMMARY OF THE INVENTION

These and other objects of the invention are accomplished in accordance with the principles of the invention by providing electronic engine brake controls which monitor various conditions in the associated engine and vehicle to determine appropriate timing for compression release events during operation of the engine brake. For example, the electronic controls may monitor such engine and vehicle operating parameters as a request for engine braking from the driver of the vehicle, fuel supply to the engine cut off, engine drive train clutch engaged, transmission in an appropriate gear, engine speed, vehicle speed, engine camshaft or crankshaft position, engine cylinder pressure, turbocharger boost pressure, a request from the driver for a particular engine speed or vehicle speed, ambient air temperature, ambient barometric pressure, etc. On the basis of these parameters the electronic controls produce output signals for controlling hydraulic valves in the engine brake, which valves selectively apply high pressure hydraulic fluid to hydraulic actuators in the engine brake for the purpose of opening engine exhaust valves to produce compression release events. For example, the electronic controls may open and close the above-mentioned hydraulic valves at times corresponding to predetermined constant engine camshaft or crankshaft positions. Or the electronic controls may vary the times of compression release events relative to engine camshaft or crankshaft position based on current values of other engine operating parameters such as engine speed. The electronic controls may determine the appropriate compression release event timings by looking them up in a look-up table stored in a memory of the controls, or the electronic controls may perform a predetermined calculation to compute the appropriate timings.

In a particularly preferred embodiment the hydraulic valves in the engine brake are electromagnetic valves, and the electronic controls produce appropriately timed signals for each hydraulic valve.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
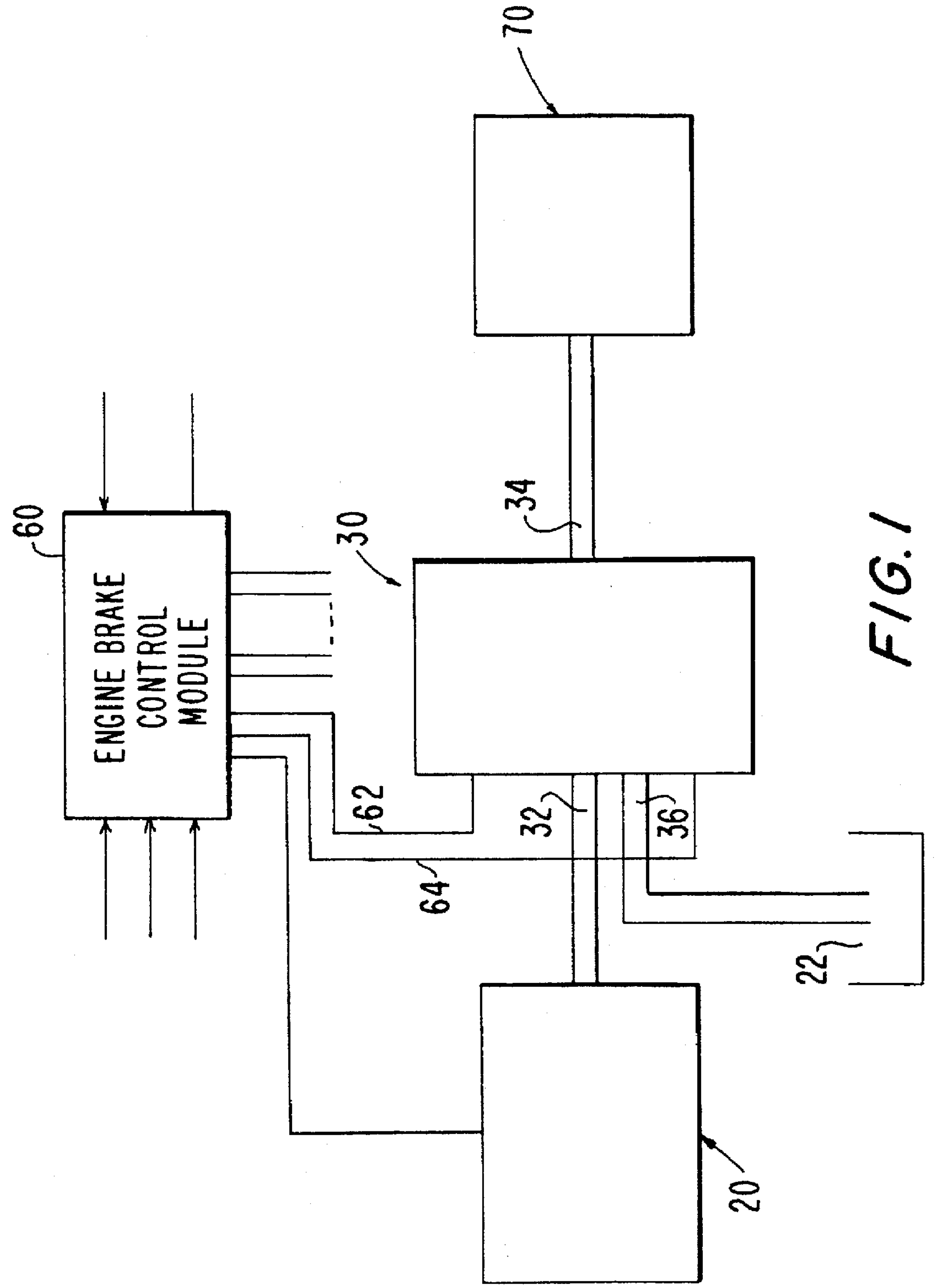
FIG. 1 is a simplified, partial, block diagram depiction of illustrative compression release engine brake apparatus which can be controlled by the electronic controls of this invention.

Illustrative compression release engine brake apparatus with which the electronic controls of this invention can be used is shown in FIG. 1.

Element 20 is a source of high pressure hydraulic fluid. The hydraulic fluid may be engine lubricating oil and source 20 may be an oil pump powered by the internal combustion engine associated with the engine brake. Element 30 is an electrically (preferably electromagnetically) operated hydraulic valve. When valve 30 is in the "open" position, port 32 is connected to port 34. High pressure hydraulic fluid from source 20 is therefore applied to element 70, which is a hydraulic device for producing a compression release event in the associated internal combustion engine (e.g., by opening an exhaust valve in the engine near top dead center of the compression stroke of the engine cylinder served by that exhaust valve). On the other hand, when valve 30 is in its "closed" position, port 32 is closed off and port 34 is connected to port 36. This allows hydraulic fluid to flow out of element 70 to low pressure hydraulic fluid sink 22. The engine therefore returns to its non-retarding condition.

Valve 30 is energized at the appropriate times by electrical signals from engine brake control module 60, which is an electronic control in accordance with this invention. As will be discussed in more detail below, control module 60 receives various inputs from the engine and the associated vehicle. On the basis of those inputs, control module 60 determines when valve 30 should be energized. Control module 60 does the same with respect to other hydraulic valves in the engine brake, which other hydraulic valves open other exhaust valves in the engine to produce compression release events in the engine cylinders served by those other exhaust valves.

FIG. 1 shows an embodiment in which control module 60 applies one signal via lead 62 to open valve 30 and another signal via lead 64 to close valve 30. Examples of hydraulic valves which operate in this way are shown in commonly assigned U.S. Pat. No. 5,479,890, which is hereby incorporated by reference herein. Alternatively, valve 30 can be of a type requiring only the presence or absence of a single signal to respectively open and close the valve. An example of a hydraulic valve which operates in this way is shown in the above-mentioned Pitzi U.S. Pat. No. 5,012,778, which is also hereby incorporated by reference herein. Other examples of valves of this type are shown in commonly assigned, U.S. Pat. No. 5,537,975, which is also incorporated by reference herein.

Figure 2:
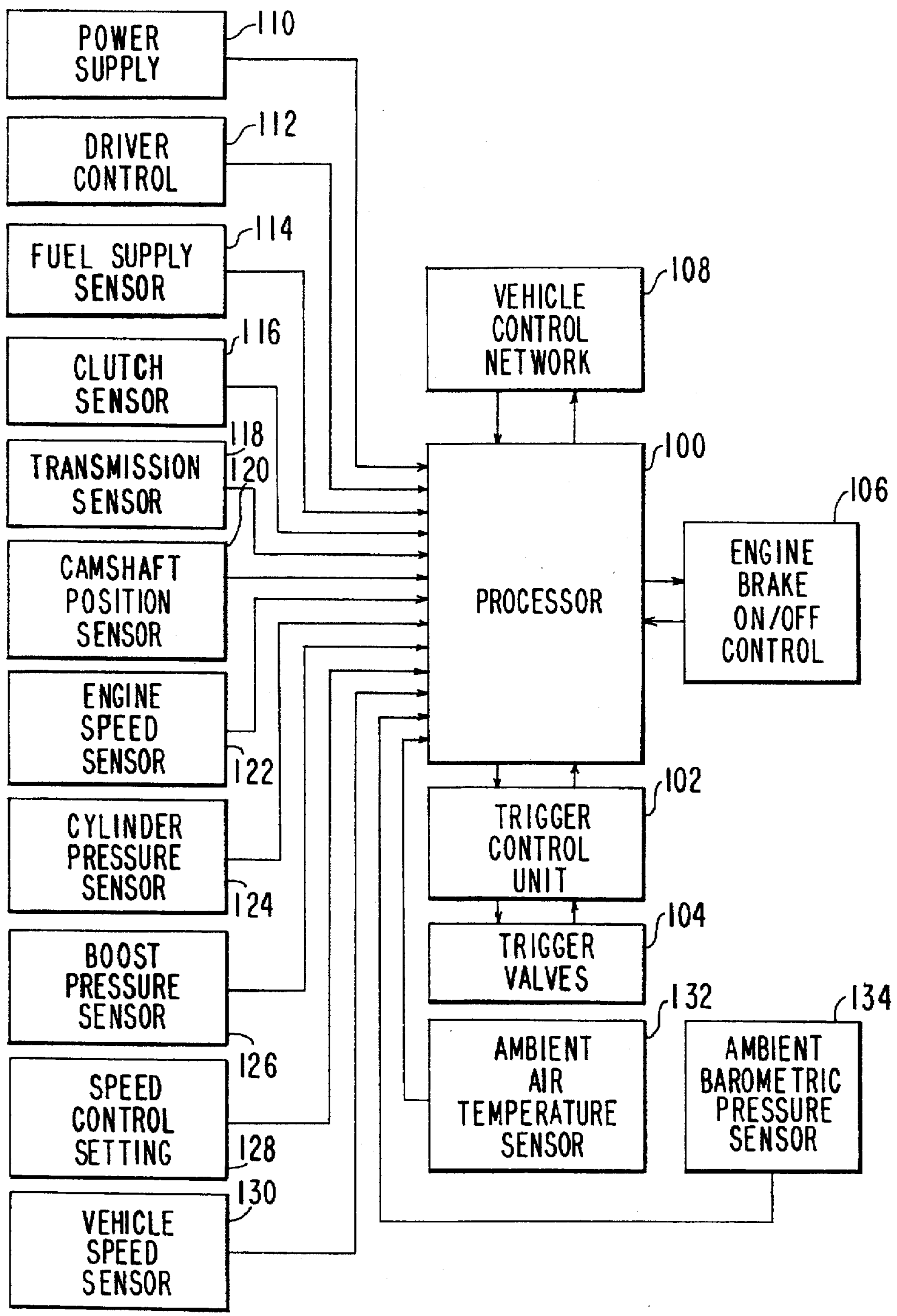
FIG. 2 is a block diagram of illustrative electronic controls constructed in accordance with this invention.

Illustrative engine brake control apparatus in accordance with this invention is shown in more detail in FIG. 2. In FIG. 2 elements 100 and 102 correspond collectively to element 60 in FIG. 1. Processor 100 may be an appropriately programmed general-purpose microprocessor augmented by appropriate memory for program and data storage, or it may be specially adapted logic circuitry. Trigger control unit 102 provides an interface between the typically digital logic of processor 100 and the typically analog electrical power requirements of the electrically controlled hydraulic valves 104 in the engine brake (of which valve 30 in FIG. 1 may be typical). Element 106 in FIG. 2 may be a solenoid or other similar device for turning high pressure hydraulic fluid source 20 in FIG. 1 on and off (assuming that source 20 requires such on/off control and is not on whenever the engine is operating). Element 108 may be the conventional control network of the vehicle associated with the engine and engine brake. For example, network 108 may include a conventional engine control module, a conventional transmission control module, a conventional wheel brake control module (including anti-lock braking control), etc. As a safety precaution, vehicle control network 108 may be capable of automatically calling for engine braking under certain engine or vehicle operating conditions detected by that network, even though the driver of the vehicle has not called for engine braking. Similarly, network 108 may be capable of overriding a driver request for engine braking and turning off the engine brake if engine or vehicle operating conditions warrant such action.

Processor 100 receives inputs from any or all of elements such as those shown along the left-hand side and across the bottom of FIG. 2. (Some or all of these elements may not feed processor 100 directly, but may instead supply their inputs to processor 100 via vehicle control network 108. Direct connection of these elements to processor 100 is shown in FIG. 2 for greater clarity and simplicity.) Power supply supplies the power required to operate processor 100. For example, power supply 110 may be the conventional 12 volt DC power supply of the vehicle. Driver control 112 may be a conventional switch in the cab of the vehicle for allowing the driver of the vehicle to select or deselect compression release engine braking. Fuel supply sensor 114 may be a conventional element for sensing when the fuel supply to the engine has been cut off. Clutch sensor 116 may be a conventional element for sensing when the vehicle clutch is engaged. Transmission sensor 118 may be a conventional element for indicating the gear that the transmission is in. Camshaft position sensor 120 may be a conventional element for indicating the angular position of the camshaft in the engine. (As an alternative to a camshaft sensor which has a 720° range in a four-cycle engine, it may be possible in some cases to use an engine crankshaft position sensor having a 360° range. For example, this may be suitable in applications in which the engine converts from four-cycle power mode operation to two-cycle air compressor operation as in Sickler U.S. Pat. No. 4,572,114.).

Engine speed sensor 122 may be a conventional tachometer-type device for indicating the speed of the engine. Cylinder pressure sensor 124 may be conventional engine instrumentation for indicating the gas pressure in the engine cylinders. This can be another indicator of engine speed. Boost pressure sensor 126 may be other conventional engine instrumentation for indicating gas pressure in the intake manifold of the engine (assuming that the engine is equipped with a turbocharger). This can also be another indicator of engine speed. Speed control setting 128 may be another driver control for allowing the driver to set a desired engine or vehicle speed during engine braking (analogous to so-called "cruise control" during power mode operation). Vehicle speed sensor 130 may be another conventional tachometer-type device for indicating the speed of the vehicle. Ambient air temperature sensor 132 may be a thermometer-type device for indicating the temperature of the ambient air as a measure of changes in the mass of air the engine is receiving. Ambient barometric pressure sensor 134 may be a barometer-type device for indicating ambient barometric pressure as another measure of the mass of air the engine is receiving. These "ambient" temperature and barometric pressure measurements may be taken at any convenient and suitable locations such as outside the engine or anywhere along the engine air intake structure.

Figure 3A:
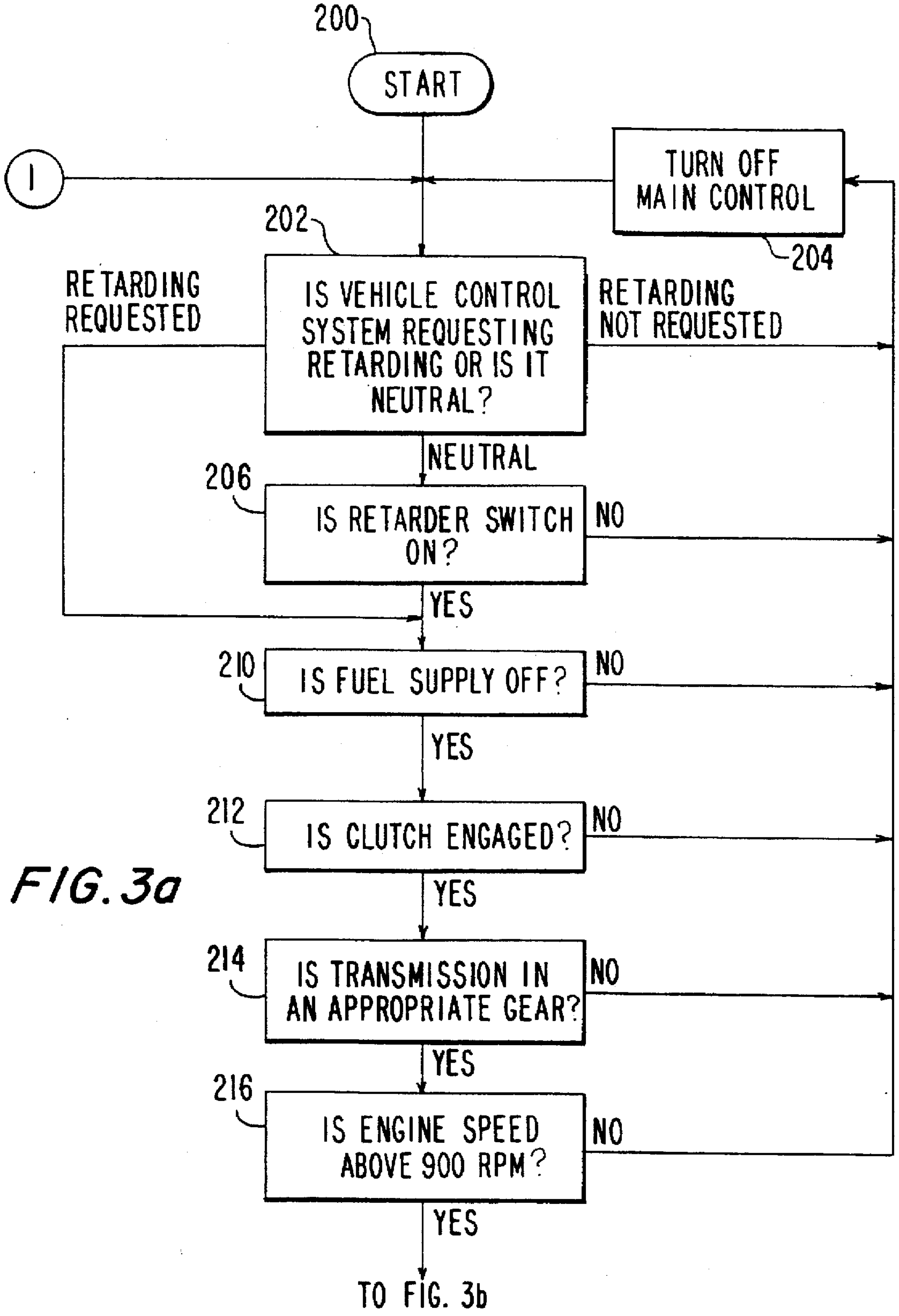
FIGS. 3*a*, 3*b*, and 3*c* (collectively referred to as FIG. 3) is a flow chart of an illustrative operating sequence that can be performed by a portion of the apparatus shown in FIG. 2 in accordance with this invention.
Figure 3B:
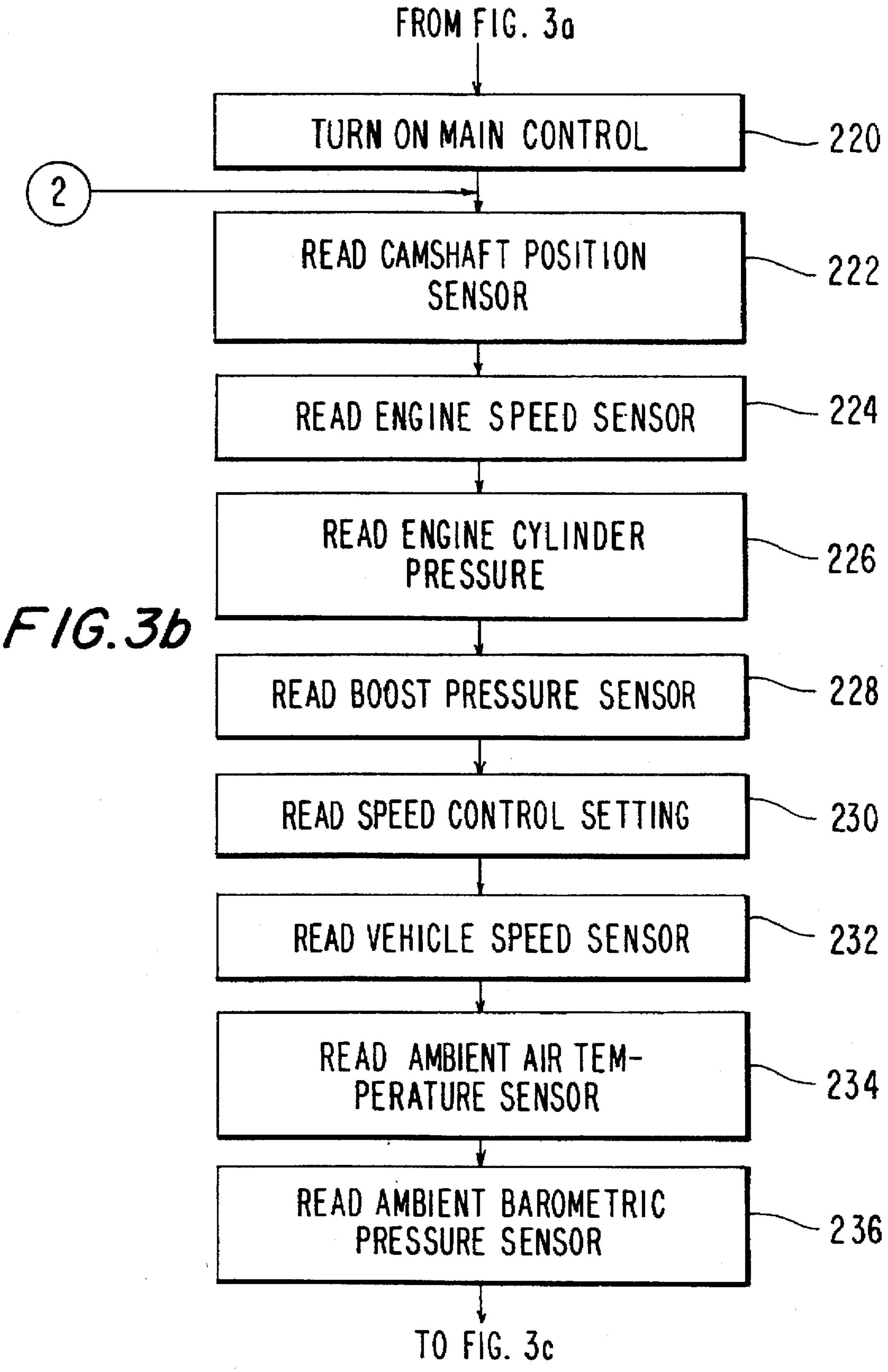
Figure 3C:
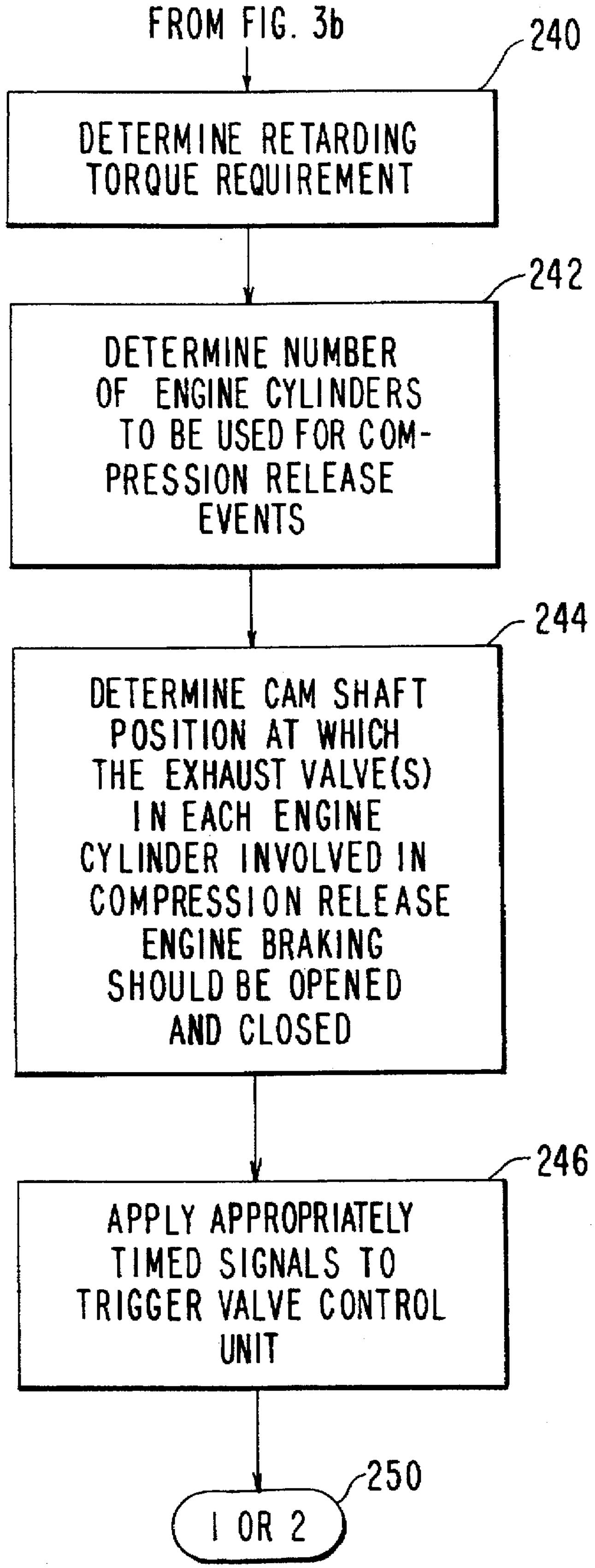

An illustrative operating sequence for processor 100 is shown in FIG. 3. This sequence starts at 200 and proceeds first to step 202 where processor 100 determines whether vehicle control network 108 is calling for retarding (i.e., compression release engine braking), or if network 108 is calling for retarding to cease or to be prevented, or if network 108 is neutral as to whether retarding should be allowed. If network 108 is calling for retarding to cease or to be prevented, control passes to step 204, whereby processor 100 turns off main engine brake control 106. If network 108 is neutral with regard to engine braking, control passes to step 206 where processor 100 checks the state of driver control 112. If the driver has not requested engine braking, control passes from step 206 to step 204. On the other hand, if the driver has requested engine braking, control passes from step 206 to step 210. If in step 202 processor 100 finds that network 108 is requesting retarding, control passes directly from step 202 to step 210.

Step 210 is the first of several steps performed by processor 100 to make sure that the operating conditions of the engine and vehicle are appropriate for the commencement or continuation of engine brake operation. In step 210 processor 100 checks fuel supply sensor 114 to make sure that the fuel supply to the engine has been cut off. If the fuel has not been cut off, control passes from step 210 to step 204. On the other hand, if the fuel supply is off, control passes from step 210 to step 212. In step 212 processor 100 checks sensor 116 to make sure that the vehicle's clutch is engaged. If not, control passes from step 212 to step 204. But if the clutch is engaged, control passes from step 212 to step 214. In step 214 processor 100 checks sensor 118 to make sure that the vehicle transmission is in an appropriate gear for engine brake operation. For example, if the transmission is in a neutral condition, engine brake operation should probably not be permitted, just as it is not permitted when the clutch is not engaged. If the transmission is not in an appropriate gear for engine brake operation, control passes from step 214 to step 204. But if the transmission is in an appropriate gear, control passes from step 214 to step 216. In step 216 processor 100 checks engine speed sensor 122 to make sure that the engine speed is at least a minimum that is appropriate for engine brake operation. For example, step 216 may require the speed of the engine to be at least 900 RPM. If the engine is not operating at at least that speed, control passes from step 216 to step 204. But if the speed of the engine is above the threshold required for engine brake operation, control passes from step 216 to step 220.

When step 220 is reached, processor 100 has found that all the conditions necessary for operation of the engine brake are present (or continue to be present). Accordingly, in step 220 processor 100 turns on main engine brake control 106. Processor 100 then performs a series of steps appropriate to enable it to determine when each of the trigger valves in the engine brake should be opened (to produce compression release events in the engine) and closed (to ready the associated engine cylinder to produce its next compression release event).

In step 222 processor 100 reads camshaft position sensor 120. (In the above-mentioned alternative in which a crankshaft position sensor rather than a camshaft position sensor is used, step 222 would involve reading the crankshaft position sensor.) This step is the primary source of synchronism between the operation of the engine and the timing of the compression release events controlled by processor 100. Processor 100 may read camshaft position sensor 120 on an effectively continuous basis, or it may read sensor 120 somewhat less frequently and use an approximately concurrent reading of engine speed sensor 122 (step 224) to provide a basis for calculating camshaft position between actual readings of sensor 120.

In steps 224, 226, 228, 230, 232, 234, and 236 processor 100 may read any of several sensors whose output values may make it appropriate for processor 100 to modify the timings of the compression release events it produces or to otherwise modify the operation of the engine brake. For example, in step 224 processor 100 may read engine speed sensor 122. In step 226 processor 100 may read engine cylinder pressure sensor 124. In step 228 processor 100 may read turbocharger boost pressure sensor 126. In step 230 processor 100 may read a desired speed setting established by the driver via control 128. In step 232 processor 100 may read vehicle speed sensor 130. In step 234 processor 100 may read ambient air temperature sensor 132. And in step 236 processor 100 may read ambient barometric pressure sensor 134.

In step 240 processor may use data from the preceding steps to determine the engine braking torque currently required from the engine. For example, if the current engine braking torque is TC, and if the current engine or vehicle speed is less than the desired speed indicated by control 128, processor 100 may determine that the new engine braking torque requirement TN should be TC−DT, where DT is a predetermined positive torque increment. On the other hand, if processor 100 has found that engine speed is more than the desired speed indicated by control 128, processor 100 may determine that TN should be TC+DT.

In step 242 processor 100 determines how many engine cylinders should be used to produce the desired retarding torque. In general, the higher the retarding torque requirement, the more engine cylinders should be used. However, step 242 may also take into account such factors as engine speed, engine cylinder pressure, and/or turbocharger boost pressure (from steps 224, 226, and 228). This is so because, particularly at higher engine speeds and therefore at higher cylinder and boost pressures, it may be possible to produce a desired amount of engine braking with only some of the engine cylinders, but it may be preferable to somewhat suboptimize the timings of the compression release events and use more than the minimum number of engine cylinders that could be used to produce the desired amount of engine braking. This technique may be used to limit or reduce the load on the parts of the engine brake and engine that cooperate to produce compression release events. At higher engine speeds, peak engine cylinder pressure and turbocharger boost pressure increase and may reach a point at which undesirably large forces are required to open the engine exhaust valves near top dead center at the end of engine compression strokes. Processor 100 can reduce these forces by opening the exhaust valves slightly more in advance of the top dead center condition than is preferable at lower engine speeds and therefore at lower engine cylinder and boost pressures. Advancing the timing of compression release events in this way somewhat lowers the retarding torque produced by each event, but it also advantageously reduces the load on various engine brake and engine components. Thus, as has been said, processor 100 may take into account considerations such as these in performing step 242.

Step 242 may also take into account such factors as ambient air temperature and/or ambient barometric pressure (from steps 234 and 236). This is so because these factors influence the mass of air received by the engine, and air mass in the engine cylinders influences the amount of engine braking associated with each compression release event. Thus at higher temperatures and/or lower barometric pressures step 242 may determine that more engine cylinders should be operated in engine braking mode to produce a given amount of engine braking.

In step 244 processor 100 determines the timing of the opening and closing of each trigger valve to be used in the engine brake. Once again in step 244 processor 100 may make use of the data derived in earlier steps from sensors 120, 122, 124, 126, 128, 130, 132, and 134, as well as the determinations made as the result of performing steps 240 and 242. From a fixed reference angular position RAP of the engine camshaft, each engine cylinder has its own offset angle OA to the top dead center condition at the end of its compression strokes. For example, cylinder i has offset angle OAi. Processor 100 may open the exhaust valve(s) in each cylinder at a predetermined number of degrees DO before top dead center of the compression stroke. Similarly, processor 100 may close those exhaust valve(s) at a predetermined number of degrees DC after top dead center of the compression stroke. Thus with reference to RAP, processor 100 may open the exhaust valve(s) of engine cylinder i at a camshaft angle OPENAi given by the equation:

$$OPENAi=RAP+OAi-DO \qquad (1)$$

Similarly processor 100 may close the exhaust valve(s) of engine cylinder i at a camshaft angle CLOSEAi given by the equation:

$$CLOSEAi=RAP+OAi+DC \qquad (2)$$

Of course, processor 100 can convert equations (1) and (2) to the real-time domain by knowing the real time at which the camshaft is at RAP and by knowing the current speed of the engine and therefore the current rate of rotation of the camshaft. Processor 100 can derive this information from sensors 120 and 122 by performing steps 222 and 224. In this way processor 100 determines (in step 244) when to signal trigger control unit 102 to open and close each trigger valve 104 currently required for engine braking. Step 246 represents the issuance by processor 100 of these signal instructions to trigger valve control unit 102.

In performing step 244 processor 100 may use predetermined nominal values of DO and DC at all times. For example, processor 100 may always use a DO value of 30° (i.e., 30° prior to top dead center of the compression stroke) and a DC value of 90° (i.e., 90° after top dead center of the compression stroke). Alternatively, processor 100 may vary these values as a function of various engine and vehicle operating conditions monitored by the processor. For example, processor 100 may compute DO in accordance with the following relationship:

$$DO=f(ES, CP, BP, SCS, VS, AAT, ABP) \qquad (3)$$

where ES is engine speed (derived from sensor 122 in step 224), CP is engine cylinder pressure (derived from sensor 124 in step 226), BP is turbocharger boost pressure (derived from sensor 126 in step 228), SCS is a speed control setting (derived from sensor 128 in step 230), VS is vehicle speed (derived from sensor 130 in step 232), AAT is ambient air temperature (derived from sensor 132 in step 234), and ABP is ambient barometric pressure (derived from sensor 134 in step 236). In particular, processor 100 may increase DO as any of ES, CP, BP, SCS, VS, and ABP increase, and may decrease DO as any of these parameters decrease. On the other hand, processor 100 may increase DO as AAT decreases, and may decrease DO as AAT increases. Increasing DO advances each compression release event relative to top dead center of the associated compression stroke. This tends to decrease the retarding torque produced, but it also tends to reduce the forces required to open the exhaust valves. As mentioned earlier, this may be desirable to prevent undesirably high stresses in the components involved in producing compression release events at high engine speeds and pressures, at low ambient air temperature, and/or at high ambient barometric pressures. Decreasing DO retards the compression release events relative to top dead center of the compression strokes, thereby tending to increase the retarding torque produced. This may be permissible at lower engine speeds and pressures, at high ambient air temperatures, and/or at low ambient barometric pressures. By way of illustration, processor 100 may automatically vary DO through a range from about 40° to about 20° before top dead center of the compression strokes of the engine using expression (3).

Figure 4:
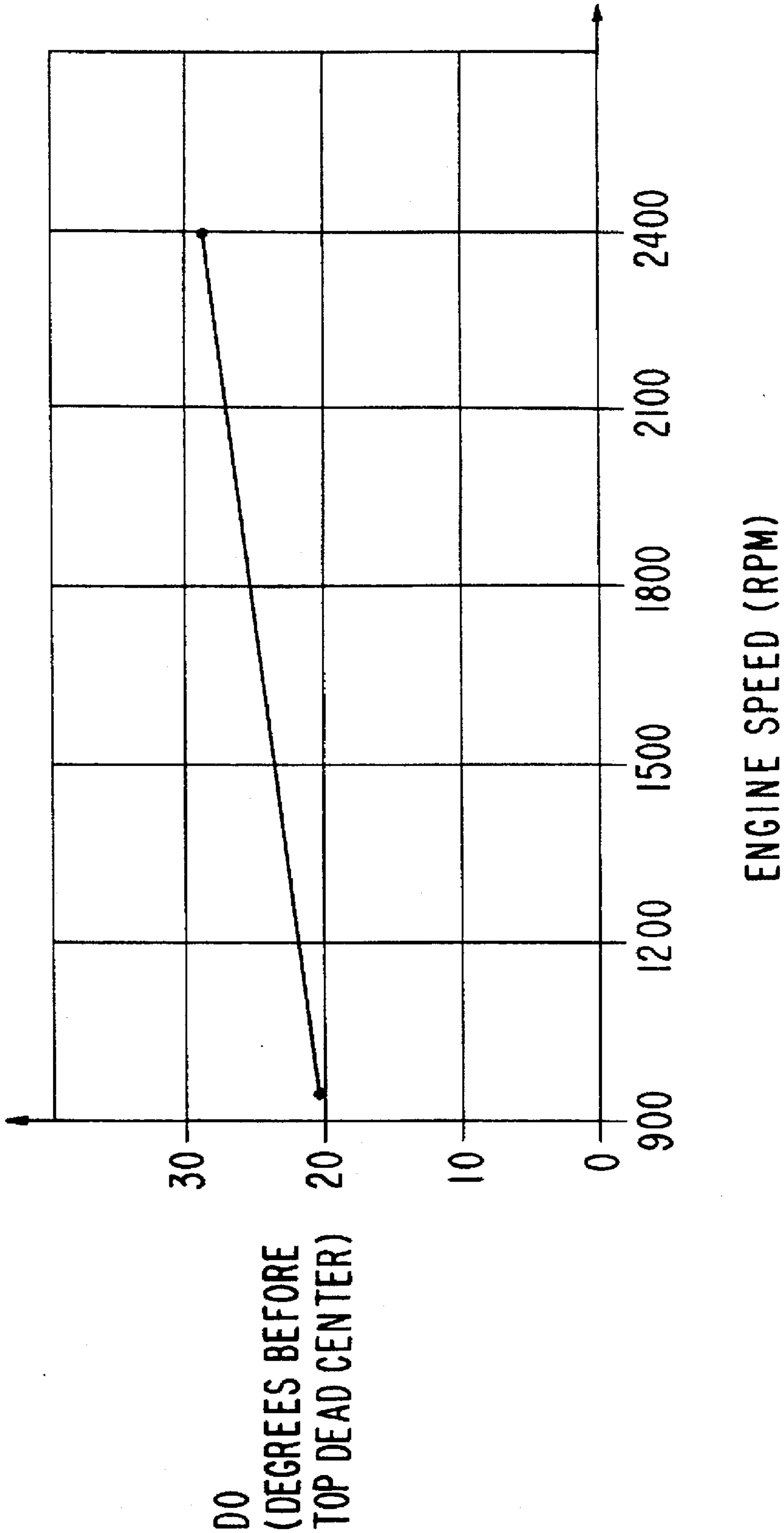
FIG. 4 is an illustrative diagram of control data that can be stored as a look-up table in a portion of the apparatus shown in FIG. 2 and used during the operating sequence of FIG. 3 in accordance with this invention.

Processor 100 may automatically vary DO as described above by performing a calculation of the type represented by expression (3). Alternatively, processor 100 may use one or more of the parameters on the right-hand side of expression (3) as address information to look up appropriate corresponding values of DO previously stored in a look-up table memory which is part of processor 100. FIG. 4 is an illustrative example of such a look-up table based on engine speed.

The operating sequence shown in FIG. 3 ends at step 250, which returns control to either step 202 or step 222. For example, step 250 may cause control to return to step 222 most of the times that step 250 is reached, with control being returned to step 202 somewhat less frequently (e.g., approximately once per second). Return to step 222 will automatically continue operation of the engine brake. Return to step 202 causes processor 100 to check whether continued engine bring is appropriate, and if not, to turn off the engine brake via performance of step 204.

It will be understood that the foregoing is only illustrative of the principles of this invention, and that various modifications can be made by those skilled in the art without departing from the scope and spirit of the invention. For example, not all of the engine and vehicle operation sensors and sensor reading steps may be needed in all cases, and those that are not needed can be readily eliminated from the apparatus (FIG. 2) and the processor operating sequence (FIG. 3). As another example of modifications within the scope of this invention, it may be possible (as in the above-mentioned Sickler patent) to convert the engine from four-cycle power mode operation to two-cycle operation during engine braking. In that event, processor 100 may operate to produce a compression release event each time an engine cylinder is approaching top dead center. Although processor 100 will then be producing compression release events twice as rapidly as is generally assumed in the foregoing discussion, the basic operating principles of the invention are the same as described above.

The invention claimed is:

1. The method of controlling a compression release engine brake of the type having an electrically operated hydraulic valve for selectively applying high pressure hydraulic fluid to a hydraulic actuator which responds to the application of said high pressure hydraulic fluid by opening a valve in an internal combustion engine associated with said engine brake to produce a compression release event in said engine, said method comprising the steps of:

monitoring an operating condition of said engine;

applying a first electrical signal to said hydraulic valve to open said hydraulic valve at a time based at least in part on said operating condition; and applying a second electrical signal to said hydraulic valve to close said hydraulic valve at a time based at least in part on said operating condition.

2. The method defined in claim 1 wherein said operating condition is motion of said engine through its operating cycle, and wherein said method further comprises the steps of:

monitoring at least one other operating condition of said engine; and modifying the time of application of said first electrical signal to said hydraulic valve based at least in part on said other operating condition.

3. The method defined in claim 2 wherein said other operating condition of said engine is selected from the group consisting of: engine speed, gas pressure in a cylinder of said engine, gas pressure in an intake manifold of said engine, and ambient barometric pressure.

4. The method defined in claim 3 wherein said step of monitoring said other operating condition includes the step of using a parameter value proportional to said other operating condition to measure said other operating condition, and wherein said modifying step advances the time of application of said first electrical signal to said hydraulic valve relative to said motion of said engine through its operating cycle in response to an increase in said parameter value.

5. The method defined in claim 2 wherein said other operating condition of said engine is ambient air temperature.

6. The method defined in claim 5 wherein said step of monitoring said other operating condition includes the step of using a parameter value proportional to said other operating condition, and wherein said modifying step advances the time of application of said first electrical signal to said hydraulic valve relative to said motion of said engine through its operating cycle in response to a decrease in said parameter value.

7. The method defined in claim 1 further comprising the steps of:

monitoring a first parameter proportional to a desired engine speed;

monitoring a second parameter proportional to actual engine speed; and modifying the time of application of said first electrical signal to said hydraulic valve in order to reduce any difference between said first and second parameters.

8. The method defined in claim 1 further comprising the steps of:

monitoring a first parameter proportional to a desired vehicle speed;

monitoring a second parameter proportional to actual vehicle speed; and modifying the time of application of said first electrical signal to said hydraulic valve in order to reduce any difference between said first and second parameters.

9. The method defined in claim 1 wherein said engine has a plurality of cylinders, and wherein said engine brake has an electrically operated hydraulic valve and a hydraulic actuator for each engine cylinder, said method further comprising the steps of:

monitoring a first parameter proportional to desired engine speed; and monitoring a second parameter proportional to actual engine speed;

modifying the number of said electrically operated hydraulic valves that are enabled in order to reduce any difference between said first and second parameters.

10. The method defined in claim 1 wherein said engine has a plurality of cylinders, and wherein said engine brake has an electrically operated hydraulic valve and a hydraulic actuator for each engine cylinder, said method further comprising the steps of:

monitoring a first parameter proportional to a desired vehicle speed;

monitoring a second parameter proportional to actual vehicle speed; and modifying the number of said electrically operated hydraulic valves that are enabled in order to reduce any difference between said first and second parameters.

11. The method of claim 1 wherein the step of monitoring an operating condition of said engine comprises the steps of:

monitoring the internal motion of said engine to detect the progress of the engine cylinder served by said valve in said engine through the cycle of operation of said engine cylinder;

monitoring at least one other operating condition of said engine; and wherein the step of applying said first electrical signal comprises the step of:

applying an electrical signal to said hydraulic valve to open said hydraulic valve at a time based at least in part on said progress of said engine cylinder and said other operating condition of said engine, wherein said other operating condition is a first parameter proportional to engine speed; and wherein said method further comprises the steps of:

monitoring a second parameter proportional to a desired engine speed; and modifying said time in order to reduce any difference between said first and second parameters.

12. The method of claim 1 wherein the step of monitoring an operating condition of said engine comprises the steps of:

monitoring the internal motion of said engine to detect the progress of the engine cylinder served by said valve in said engine through the cycle of operation of said engine cylinder;

monitoring at least one other operating condition of said engine; and wherein the step of applying said first electrical signal comprises the step of:

applying an electrical signal to said hydraulic valve to open said hydraulic valve at a time based at least in part on said progress of said engine cylinder and said other operating condition of said engine; and wherein said method further comprises the steps of:

monitoring a first parameter proportional to a desired vehicle speed;

monitoring a second parameter proportional to actual vehicle speed; and modifying said time in order to reduce any difference between said first and second parameters.

13. The method of claim 1 wherein the step of monitoring an operating condition of said engine comprises the steps of:

monitoring the internal motion of said engine to detect the progress of the engine cylinder served by said valve in said engine through the cycle of operation of said engine cylinder;

monitoring at least one other operating condition of said engine; and wherein the step of applying said first electrical signal comprises the step of:

applying an electrical signal to said hydraulic valve to open said hydraulic valve at a time based at least in part on said progress of said engine cylinder and said other operating condition of said engine, wherein said engine has a plurality of cylinders, wherein said engine brake has an electrically operated hydraulic valve and a hydraulic actuator for each engine cylinder, and wherein said other operating condition is a first parameter proportional to engine speed; and wherein said method further comprises the steps of:

monitoring a second parameter proportional to a desired engine speed; and selecting a number of said electronically operated hydraulic valves to enable in order to reduce any difference between said first and second parameters.

14. The method of claim 1 wherein the step of monitoring an operating condition of said engine comprises the steps of:

monitoring the internal motion of said engine to detect the progress of the engine cylinder served by said valve in said engine through the cycle of operation of said engine cylinder;

monitoring at least one other operating condition of said engine; and wherein the step of applying said first electrical signal comprises the step of:

applying an electrical signal to said hydraulic valve to open said hydraulic valve at a time based at least in part on said progress of said engine cylinder and said other operating condition of said engine, wherein said engine has a plurality of cylinders, wherein said engine brake has an electrically operated hydraulic valve and a hydraulic actuator for each engine cylinder, and wherein said other operating condition is a first parameter proportional to vehicle speed; and wherein said method further comprises the steps of:

monitoring a second parameter proportional to a desired vehicle speed; and selecting a number of said electronically operated hydraulic valves to enable in order to reduce any difference between said first and second parameters.

15. The method of controlling a compression release engine brake of the type having an electrically operated hydraulic valve for selectively applying high pressure hydraulic fluid to a hydraulic actuator which responds to the application of said high pressure hydraulic fluid by opening a valve in an internal combustion engine associated with said engine brake to produce a compression release event in said engine, said method comprising the steps of:

monitoring the internal motion of said engine to detect the progress of the engine cylinder served by said valve in said engine through the cycle of operation of said engine cylinder;

monitoring at least one other operating condition of said engine; and applying an electrical signal to said hydraulic valve to open said hydraulic valve at a time based at least in part on said progress of said engine cylinder and said other operating condition of said engine, wherein said other operating condition of said engine is selected from the group consisting of: gas pressure in a cylinder of said engine, gas pressure in an intake manifold of said engine, and ambient barometric pressure.

16. The method of controlling a compression release engine brake of the type having an electrically operated hydraulic valve for selectively applying high pressure hydraulic fluid to a hydraulic actuator which responds to the application of said high pressure hydraulic fluid by opening a valve in an internal combustion engine associated with said engine brake to produce a compression release event in said engine, said method comprising the steps of:

monitoring the internal motion of said engine to detect the progress of the engine cylinder served by said valve in said engine through the cycle of operation of said engine cylinder;

monitoring at least one other operating condition of said engine; and applying an electrical signal to said hydraulic valve to open said hydraulic valve at a time based at least in part on said progress of said engine cylinder and said other operating condition of said engine, wherein said other operating condition of said engine is selected from the group consisting of: engine speed, gas pressure in a cylinder of said engine, gas pressure in an intake manifold of said engine, and ambient barometric pressure, wherein said step of monitoring said other operating condition includes the step of using a parameter value proportional to said other operating condition to measure said other operating condition, and wherein said time is advanced relative to said progress of said cylinder in response to an increase in said parameter value.

17. The method of controlling a compression release engine brake of the type having an electrically operated hydraulic valve for selectively applying high pressure hydraulic fluid to a hydraulic actuator which responds to the application of said high pressure hydraulic fluid by opening a valve in an internal combustion engine associated with said engine brake to produce a compression release event in said engine, said method comprising the steps of:

monitoring the internal motion of said engine to detect the progress of the engine cylinder served by said valve in said engine through the cycle of operation of said engine cylinder;

monitoring at least one other operating condition of said engine; and applying an electrical signal to said hydraulic valve to open said hydraulic valve at a time based at least in part on said progress of said engine cylinder and said other operating condition of said engine, wherein said other operating condition of said engine is ambient air temperature.

18. The method defined in claim 17 wherein said step of monitoring said other operating condition includes the step of using a parameter value proportional to said other operating condition to measure said other operating condition, and wherein said time is advanced relative to said progress of said cylinder in response to a decrease in said parameter value.

19. The method of operating a compression release engine brake of the type which opens valves in the cylinders of an associated internal combustion engine in order to release from those cylinders air that has been compressed in the cylinders by operation of the engine, said method comprising the steps of:

monitoring a predetermined characteristic of air which is ambient to said engine; and modifying performance of said engine brake based at least in part on said ambient air characteristic.

20. The method defined in claim 19 wherein said ambient air characteristic is selected from the group consisting of temperature and barometric pressure.

21. The method defined in claim 19 wherein said modifying step comprises the step of changing how many cylinders of said engine said engine brake opens valves in.

22. The method defined in claim 19 wherein said modifying step comprises the step of changing when said engine brake opens a valve in an engine cylinder relative to the air compression cycle of said engine cylinder.

23. The method defined in claim 21 wherein said ambient air characteristic is temperature, and wherein said changing step comprises the step of increasing the number of engine cylinders said engine brake opens valves in in response to an increase in said temperature.

24. The method defined in claim 21 wherein said ambient air characteristic is barometric pressure, and wherein said changing step comprises the step of increasing the number of engine cylinders said engine brake opens valves in in response to a decrease in said barometric pressure.

25. The method defined in claim 22 wherein said ambient air characteristic is temperature, and wherein said changing step comprises the step of shifting the opening of said valve closer in time to when said engine cylinder tends to produce its maximum compression of air in response to an increase in said temperature.

26. The method defined in claim 22 wherein said ambient air characteristic is barometric pressure, and wherein said changing step comprises the step of shifting the opening of said valve closer in time to when said engine cylinder tends to produce its maximum compression of air in response to a decrease in said barometric pressure.

* * * * *